T. C. Richards,
Screw Head.
No. 92,361. Patented July 6, 1869.
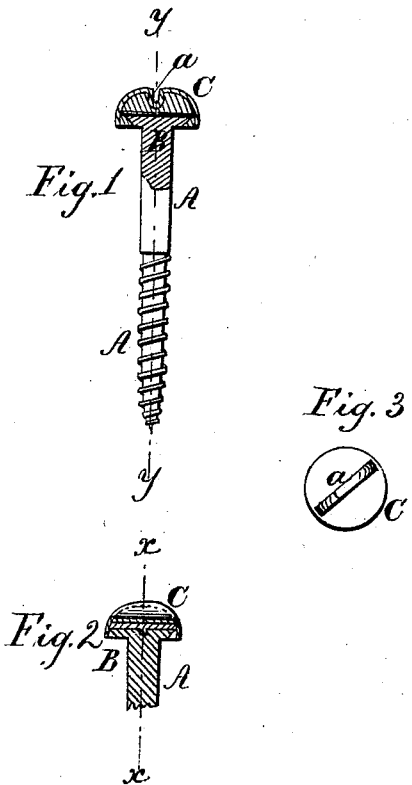
Witnesses
A. W. Almqvist
O. Hinchman
Inventor
T. C. Richards
per Munn & Co.
Attorneys.

United States Patent Office.

T. C. RICHARDS, OF NEW YORK, N. Y.

Letters Patent No. 92,361, dated July 6, 1869.

---

IMPROVED HEAD FOR SCREWS.

---

The Schedule referred to in these Letters Patent and making part of the same.

---

To all whom it may concern:

Be it known that I, T. C. RICHARDS, of the city of New York, in the county and State of New York, have invented a new and useful Improvement in Brass-Headed Screws; and I do hereby declare that the following is a full, clear, and exact description thereof, which will enable others skilled in the art to make and use the same, reference being had to the accompanying drawings, forming part of this specification, in which—

Figure 1 is a side view of a screw to which my improved head has been attached, partly in section through the line $x$-$x$, fig. 2.

Figure 2 is a detail sectional view of the same, taken through the line $y$-$y$, fig. 1.

Figure 3 is a plan view of my improved sheet-metal cap, designed for application to notched flat-headed screws.

Similar letters of reference indicate corresponding parts.

My invention has for its object to furnish an improved sheet brass-headed screw, which shall be so constructed and arranged that the notch or recess for the screw-driver may be formed wholly in the brass head, which shall still be securely fastened to the ordinary flat screw-head; and It consists in the brass head, constructed and arranged, with reference to the ordinary flat-headed screw, in the manner hereinafter more fully described.

A represents the body, and B, the head of an ordinary flat-headed wood-screw.

The head B is notched or slotted, to receive the screw-driver in the ordinary manner.

C is the brass head, which is completely formed before it is attached to the screw A B.

The notch or recess for the screw-driver is formed in the head C, in such a way as not to cut or break the metal, as shown in fig. 1.

The head B, of the screw A, is then placed in the cavity of the head C, as shown in figs. 1 and 2, and is then soldered in this position, the solder flowing into and filling the space between the brass head C and the screw-head B, and into and filling the notch or slot of the said head B, as shown in figs. 1 and 2, so as to securely connect the head C to the head of the screw A B.

This construction renders it unnecessary that the edge of the brass head C should be turned down over the head B of the screw A, as has heretofore been the practice in securing the brass heads to the screw-heads.

This construction enables me to readily attach brass heads to flat-headed screws, rendering the cost less than when round-headed screws are used, as has heretofore been necessary.

A great advantage of my improved brass-headed screw over others, upon which the brass heads are spun, is that the notch in the brass head is not cut through, so that should the screw-driver slip, it cannot strip off any of the brass head or injure it.

In the case of other brass-headed screws, should the screw-driver slip, a part of the brass head is almost always torn off, so as to destroy the beauty of the screw-heads.

This construction also enables the brass heads to be made heavier than the spun heads can be, so that the screws have all the appearance and about the strength of solid brass-headed screws.

I am aware that flat and round-headed screws have been capped by spinning or closing thin sheets of metal over said screw-heads, conforming to their shape.

I am also aware that the notches or slots have been formed in said brass heads, both before and after they have been attached to the screw-heads; but in every instance they have been formed by cutting through the brass head, so as to use the notch in the screw-head for turning the screws.

These constructions I do not claim; but

What I claim as new, and desire to secure by Letters Patent, is—

A rounded sheet-metal cap, provided with a depression or notch, $a$, formed to receive the screw-driver, without cutting or breaking the metal for that purpose, and attached to a flat-headed screw, substantially as and for the purpose set forth.

The above specification of my invention signed by me, this 21st day of April, 1869.

T. C. RICHARDS.

Witnesses:
 FRANK BLOCKLEY,
 JAMES T. GRAHAM.